United States Patent
Kang et al.

(10) Patent No.: US 8,785,017 B2
(45) Date of Patent: Jul. 22, 2014

(54) SECONDARY BATTERY

(75) Inventors: Chohee Kang, Yongin-si (KR); Junsun Yong, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 814 days.

(21) Appl. No.: 12/855,467

(22) Filed: Aug. 12, 2010

(65) Prior Publication Data

US 2011/0151294 A1 Jun. 23, 2011

(30) Foreign Application Priority Data

Dec. 23, 2009 (KR) .................. 10-2009-0129896

(51) Int. Cl.
  *H01M 2/12* (2006.01)
(52) U.S. Cl.
  USPC ............. 429/82; 429/177; 429/175; 429/163; 429/159
(58) Field of Classification Search
  USPC .................... 429/177, 175, 163, 159, 82
  See application file for complete search history.

(56) References Cited

U.S. PATENT DOCUMENTS

| | | | |
|---|---|---|---|
| 2005/0244706 A1 | 11/2005 | Wu et al. | |
| 2006/0275665 A1* | 12/2006 | Hyung et al. | 429/223 |
| 2007/0166614 A1* | 7/2007 | Kato et al. | 429/223 |
| 2008/0187827 A1 | 8/2008 | Kim et al. | |
| 2010/0143796 A1* | 6/2010 | Mao et al. | 429/185 |
| 2011/0091748 A1 | 4/2011 | Hyung et al. | |
| 2011/0183164 A1 | 7/2011 | Wu et al. | |

FOREIGN PATENT DOCUMENTS

| | | |
|---|---|---|
| CN | 1950961 | 4/2007 |
| CN | 101257099 | 9/2008 |
| JP | 2006-286624 A | 10/2006 |
| KR | 10-2008-0043533 | 5/2008 |
| KR | 10-2008-0072443 | 8/2008 |
| KR | 10-2009-0022418 | 3/2009 |
| KR | 10-2009-0047780 | 5/2009 |
| KR | 10-2009-0110710 A | 10/2009 |
| WO | WO 2008/106834 | * 9/2008 |

OTHER PUBLICATIONS

KR 10-2007-0113806 machine translation.*

* cited by examiner

*Primary Examiner* — Patrick Ryan
*Assistant Examiner* — Alex Usyatinsky
(74) *Attorney, Agent, or Firm* — Knobbe Martens Olson & Bear LLP

(57) ABSTRACT

Disclosed is a secondary battery that comprises an electrode assembly, a can accommodating the electrode assembly, and a cap assembly coupled to an upper portion of the can and including an upper cap that transfers a current of the electrode assembly to an exterior of the can. The upper cap includes a terminal part including a first flat portion disposed at a center of the upper cap and a second flat portion extending from a periphery of the first flat portion, a peripheral part disposed at a periphery of the terminal part and stepped from the terminal part, and a connection part connecting the terminal part to the peripheral part.

12 Claims, 3 Drawing Sheets

SECONDARY BATTERY

CROSS-REFERENCE TO RELATED APPLICATIONS

This application claims priority to and the benefit of Korean Patent Application No. 10-2009-0129896, filed on Dec. 23, 2009, the entire content of which is incorporated herein by reference.

BACKGROUND

1. Field

Embodiments relate to a secondary battery.

2. Description of the Related Technology

In general, a secondary battery includes an electrode assembly, a can accommodating the electrode assembly, and a cap assembly coupled to the upper portion of the can and including an upper cap that transfers a current of the electrode assembly to the outside.

Such a cap assembly typically includes a convex terminal part through which a current is transferred from an electrode assembly to outside the battery. An external electrode tab may be welded to the terminal part.

SUMMARY

One embodiment provides a secondary battery that can improve welding efficiency of an upper cap and improve reliability.

According to an embodiment, a secondary battery comprises: an electrode assembly; a can accommodating the electrode assembly; and a cap assembly coupled to an upper portion of the can and including an upper cap that transfers a current of the electrode assembly to an exterior of the can, wherein the upper cap includes a terminal part including a first flat portion disposed at a center of the upper cap and a second flat portion extending from a periphery of the first flat portion, a peripheral part disposed at a periphery of the terminal part and stepped from the terminal part, and a connection part connecting the terminal part to the peripheral part.

According to an embodiment, the second flat portion is disposed between the first flat portion and the connection part.

According to an embodiment, the terminal part has a diameter ranging from about 7 mm to about 8 mm. The terminal part may have a diameter ranging from 40% to about 50% of a diameter of the upper cap.

According to an embodiment, the connection part has at least one gas exhausting hole. The gas exhausting hole may extend through a portion of the terminal part and a portion of the peripheral part. The number of the gas exhausting holes may be at least three.

According to an embodiment, the second flat portion has a planar surface that is obtained by pressing a curved surface between the first flat portion and the gas exhausting hole. The second flat portion may be disposed at a region including a region between the gas exhausting holes. The gas exhausting hole may include a first curved portion disposed at a portion where the gas exhausting hole meets the terminal part, and a second curved portion disposed at a portion where the gas exhausting hole meets the connection part and the peripheral part, the first curved portion may have a radius of curvature ranging from about 1.4 mm to about 1.6 mm, and the second curved portion may have a radius of curvature ranging from about 0.1 mm to about 0.3 mm.

According to an embodiment, the cap assembly includes a lower cap installed at an upper portion of the electrode assembly and having a through hole at a center of the lower cap, a safety vent electrically connected to the electrode assembly through the through hole of the lower cap, and an insulator disposed between the safety vent and the lower cap.

The upper cap may be formed of steel plated with nickel.

BRIEF DESCRIPTION OF THE DRAWINGS

The above and other features and advantages will become more apparent to those of ordinary skill in the art by describing in detail embodiments with reference to the attached drawings, in which.

DETAILED DESCRIPTION

Embodiments will now be described more fully hereinafter with reference to the accompanying drawings. However, they may be embodied in different forms and should not be construed as limited to the embodiments set forth herein.

Hereinafter, embodiments will be described in detail with reference to the accompanying drawings.

Figure 1:
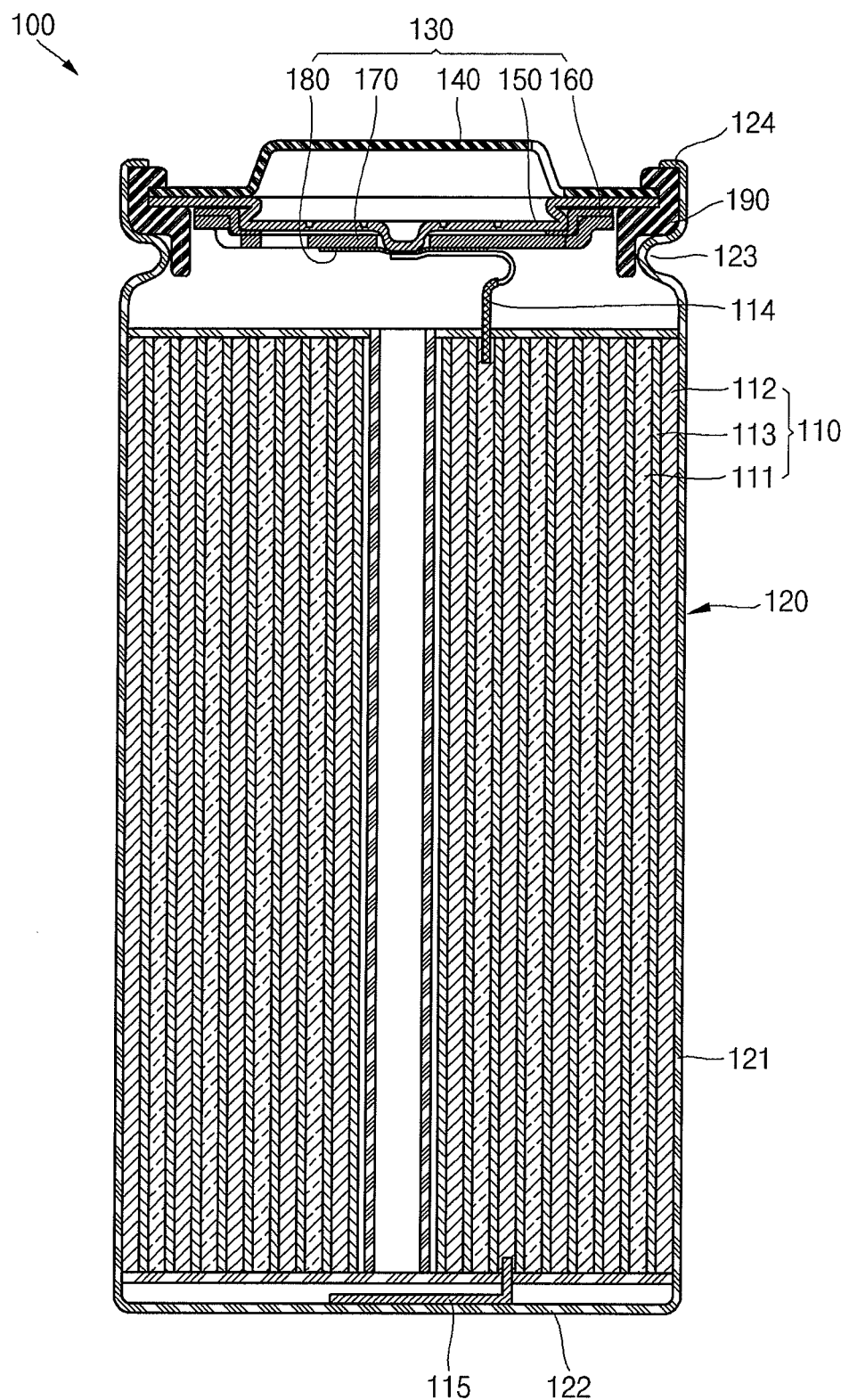
FIG. 1 is a cross-sectional view illustrating a secondary battery according to an embodiment.
Figure 2:
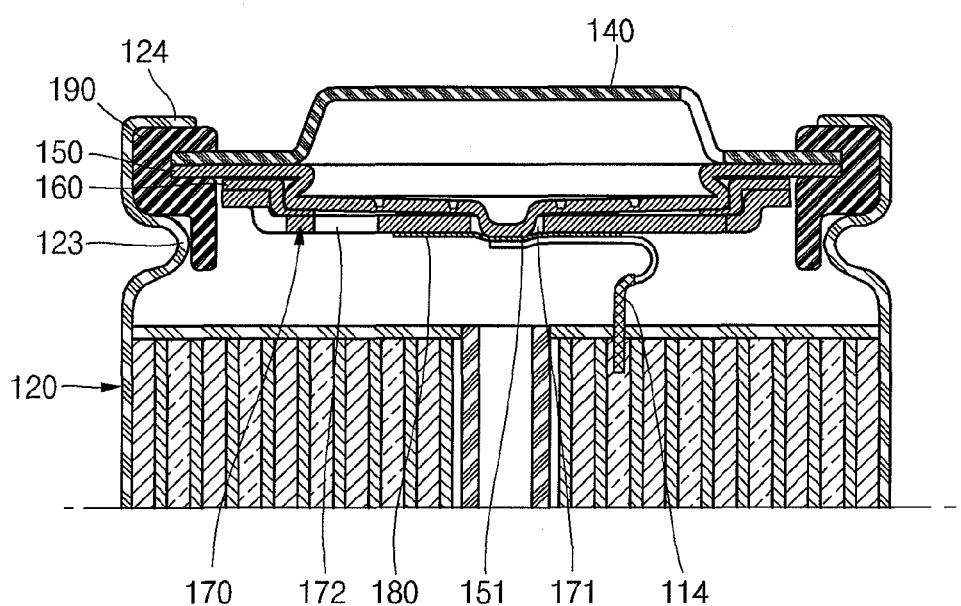
FIG. 2 is an enlarged cross-sectional view illustrating a cap assembly of FIG. 1.
Figure 3:
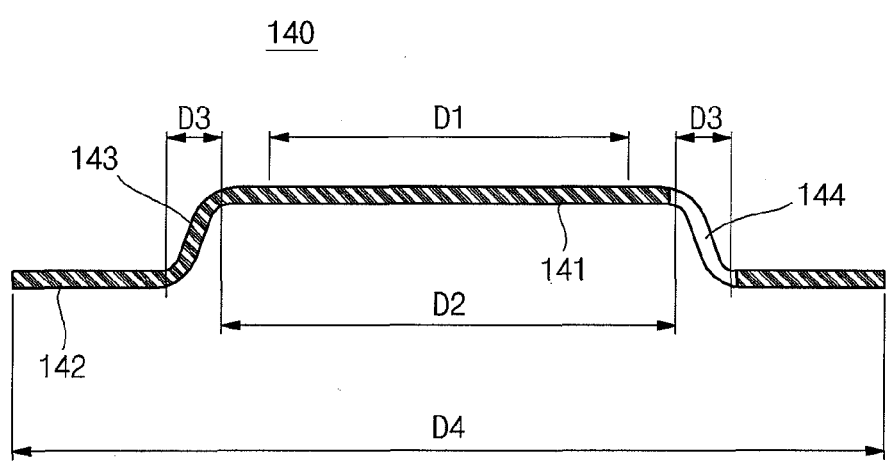
FIG. 3 is an enlarged cross-sectional view illustrating an upper cap of FIG. 1.
Figure 4:
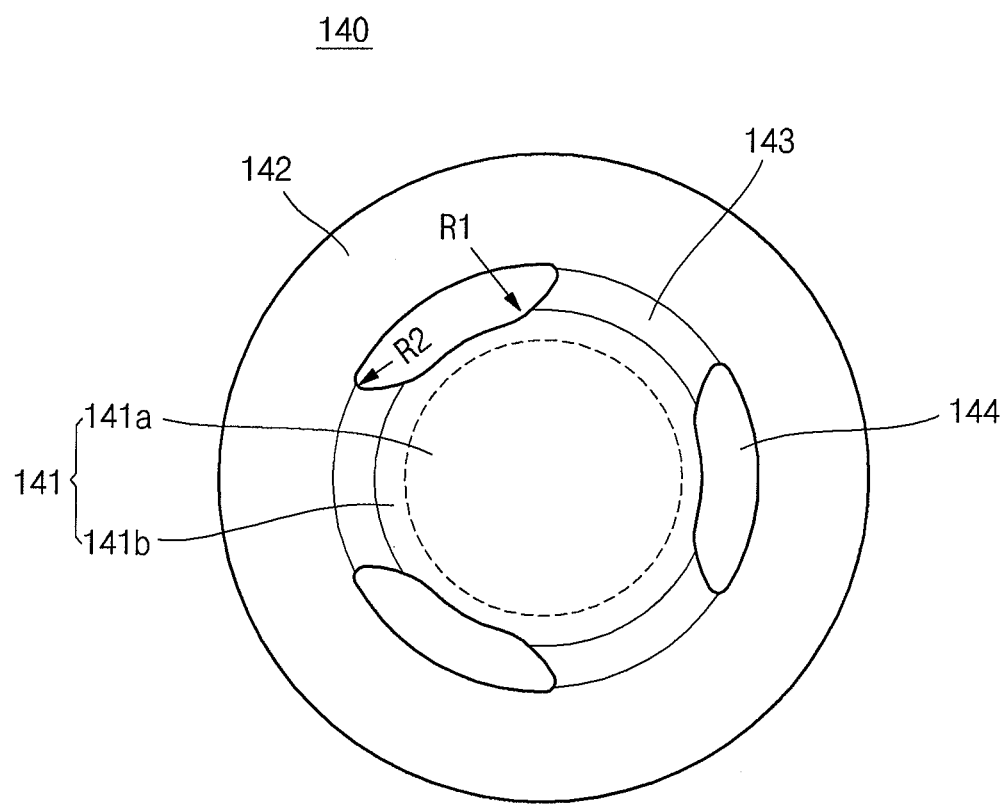
FIG. 4 is a plan view illustrating the upper cap of FIG. 3.

FIG. 1 is a cross-sectional view illustrating a secondary battery according to an embodiment. FIG. 2 is an enlarged cross-sectional view illustrating the cap assembly of FIG. 1. FIG. 3 is an enlarged cross-sectional view illustrating the upper cap of FIG. 1. FIG. 4 is a plan view illustrating the upper cap of FIG. 3.

Referring to FIGS. 1 through 4, a secondary battery 100 may include an electrode assembly 110, a can 120 accommodating the electrode assembly 110, a cap assembly 130 coupled to a top opening of the can 120, and a gasket 190 disposed on the inner surface of the top opening of the can 120. The cap assembly 130 may be placed on the gasket 190.

The electrode assembly 110 may be formed by winding a positive electrode plate 111, a negative electrode plate 112, and a separator 113 in a jelly roll shape. The positive electrode plate 111 can include a positive electrode collector having a surface coated with positive electrode active materials. The negative electrode plate 112 can include a negative electrode collector having a surface coated with negative electrode active materials. The separator 113 may be disposed between the positive electrode plate 111 and the negative electrode plate 112 to electrically insulating the positive electrode plate 111 and the negative electrode plate 112. At the upper side of the electrode assembly 110, a positive electrode tab 114 may be connected to the cap assembly 130. At the lower side of the electrode assembly 110, a negative electrode tab 115 may be connected to a bottom surface of the can 120.

The positive electrode collector of the positive electrode plate 111 may be formed of conductive metal to collect electrons from a positive electrode coating portion and move the electrons to an external circuit. The positive electrode coating portion may be formed by mixing positive electrode active materials, conductive material, and binder, and have a constant thickness through coating on the positive electrode collector. The positive electrode plate may have positive electrode non-coating portions at both ends of the positive electrode collector without the positive electrode coating portion. The positive electrode tab 114 may be welded to a side of the positive electrode non-coating portions.

The negative electrode collector of the negative electrode plate 112 may be formed of conductive metal to collect electrons from a negative electrode coating portion and move the electrons to an external circuit. The negative electrode coating portion may be formed by mixing negative electrode active materials, conductive material, and binder, and have a constant thickness through coating on the negative electrode collector. The negative electrode plate may have negative electrode non-coating portions at both ends of the negative electrode collector without the negative electrode coating portion. The negative electrode tab 115 may be welded to a side of the negative electrode non-coating portions.

The separator 113 may be disposed between the positive electrode plate 111 and the negative electrode plate 112, and may be extended to surround the outer surface of the electrode assembly 110. The separator 113 can prevent a short circuit between the positive electrode plate 111 and the negative electrode plate 112, and may be formed of porous high polymer through which lithium ions can pass.

The can 120 can include a side surface plate 121 that is a cylinder body having a constant diameter to have a space for accommodating the electrode assembly 110, and a lower surface plate 122 that seals the lower portion of the side surface plate 121. The can 120 may be formed of lightweight conductive metal such as aluminum or aluminum alloy, and may be connected to the negative electrode tab 115, and be formed through a process such as deep drawing. The top opening of the can 120 may be open, and may be closed after the electrode assembly 110 is inserted into it. A beaded part 123 preventing the move of the electrode assembly 110 may be disposed on the upper portion of the can 120. The uppermost part of the can 120 may also be provided with a crimping part 124 for fixing the cap assembly 130.

The cap assembly 130 can include an upper cap 140, a safety vent 150 installed under the upper cap 140, a lower cap 170 installed under the safety vent 150, an insulator 160 disposed between the safety vent 150 and the lower cap 170, and a sub plate 180 fixed to the lower surface of the lower cap 170 and electrically connected to the positive electrode tab 114.

The upper cap 140 may be electrically connected to the electrode assembly 110, and transmit a current generated from the electrode assembly 110 to the outside. The upper cap 140 may be formed from a circular plate, and can include a terminal part 141 protruding at its center, a peripheral part 142 stepped from the periphery of the terminal part 141, and a connection part 143 connecting the terminal part 141 to the peripheral part 142. The upper cap 140 may be formed of steel, and may be plated with nickel. As such, the upper cap 140 plated with nickel may be resistant to corrosion, and facilitates welding of an external tab.

The terminal part 141 may be electrically connected to the positive electrode tab 114 of the electrode assembly 110. An external tab may be welded to the terminal part 141 to transfer a current from the electrode assembly 110 to the outside. For example, the upper cap 140 may be welded with a positive tab connected to a positive terminal of a battery pack. In this case, the upper cap 140 may be welded with the positive tab through laser welding, resistance welding, or an equivalent thereof.

The terminal part 141 may include a first flat portion 141a and a second flat portion 141b. The first flat portion 141a may be flat and disposed at the center of the terminal part 141. The second flat portion 141b may be connected to the first flat portion 141a, and be disposed at the periphery of the first flat portion 141a, and be flat. That is, the second flat portion 141b may be disposed between the first flat portion 141a and the connection part 143. As the area of the first flat portion 141a is increased, welding and transfer of a current from the electrode assembly 110 to the outside can be facilitated. The second flat portion 141b can connect the terminal part 141 to the connection part 143, and portions of gas exhausting holes 144 may be disposed in the second flat portion 141b. The second flat portion 141b may be formed by primarily forming a curved surface between the first flat portion 141a and the gas exhausting holes 144, and then by secondly transforming the curved surface into a planar surface using a jig that may have a size corresponding to the diameter of the second flat portion 141b. That is, the curved surface of the second flat portion 141b may be pressed to form the planar surface, so that the diameter of the terminal part 141 is increased to be easily welded with an external tab. Thus, the second flat portion 141b can include a region disposed between the gas exhausting holes 144, and a region disposed between the first flat portion 141a and the connection part 143.

The peripheral part 142 is disposed at the periphery of the terminal part 141, and may be stepped from the terminal part 141. The peripheral part 142 may be electrically connected to the safety vent 150. The periphery of the peripheral part 142 may be provided with the gasket 190.

The connection part 143 connecting the terminal part 141 to the peripheral part 142 may have an upper periphery and a lower periphery. The upper periphery can be less than the lower periphery. The connection part 143 may be provided with the gas exhausting holes 144 that provide passages to exhaust gas generated in the can 120. The gas exhausting holes 144 may extend through the connection part 143, a portion of the terminal part 141, and a portion of the peripheral part 142. Any number of gas exhausting holes 144 can be provided. According to embodiments, the number of the gas exhausting holes 144 is three or four.

In the embodiment illustrated in FIG. 3, the diameter D2 of the terminal part 141 may be increased without increasing an entire diameter D4 of the upper cap 140, so as to facilitate welding of the upper cap 140 to an external tab.

To this end, the primarily curved surface of the second flat portion 141b, in the portion where the first flat portion 141a is connected to the connection part 143, may be pressed to form the planar surface, thus increasing the diameter D2 of the terminal part 141. At this point, when the diameter D2 of the terminal part 141 is increased, the upper cap 140 may sag. The terminal part 141 may be formed in a slightly convex shape to prevent the sagging of the upper cap 140. This can also prevent the terminal part 141 from being minutely recessed when being welded to an external tab.

Referring to FIG. 4, when the curved surface primarily formed between the first flat portion 141a and the gas exhausting holes 144 is pressed using a jig to form a planar surface, first curved portions R1 can be formed at the portions where the gas exhausting holes 144 meet the terminal part 141, and second curved portions R2 can be formed at the portions where the gas exhausting holes 144 meet the connection part 143 and the peripheral part 142. The first curved portions R1 may have a radius of curvature ranging from about 1.4 mm to about 1.6 mm according to embodiments. For example, the first curved portions R1 may have a radius of curvature of about 1.5 mm. When the radius of curvature of the first curved portions R1 is increased to range from about 1.4 mm to about 1.6 mm, the sizes of the gas exhausting holes 144 are increased, so as to facilitate exhausting of inner gas. The second curved portions R2 may have a radius of curvature ranging from about 0.1 mm to about 0.3 mm according to embodiments. For example, the second curved portions R2 may have a radius of curvature of about 0.2 mm. When the curved surface primarily formed between the first flat portion 141a and the gas exhausting holes 144 is pressed using a jig to form the planar surface, a horizontal length D3 of the connection part 143 may be decreased by the length of the second flat portion 141b.

That is, as described above, when the curved surface formed between the first flat portion 141a and the gas exhausting holes 144 is pressed to form the planar surface, the radius of curvature of the first curved portions R1 can be increased, and the radius of curvature of the second curved portions R2 can be decreased, so that the total areas of the gas exhausting holes 144 are increased. Accordingly, the gas exhausting holes 144 can more effectively exhaust inner gas to the outside.

In addition, when the curved surface formed between the first flat portion 141a and the gas exhausting holes 144 is pressed to form the planar surface, the horizontal length D3 of the connection part 143 can be decreased, and the length of the terminal part 141 can be increased by the decreased portion of the horizontal length D3 of the connection part 143, so that an external tab can be easily welded to the terminal part 141.

The terminal part 141 can include the first flat portion 141a. According to embodiments, the first flat portion 141a has a diameter D1 of at least 5 mm. According to an embodiment, the second flat portion 141b may be flatly extended from the first flat portion 141a, so that the diameter D2 of the terminal part 141 is increased to 7 mm or greater. For example, the diameter D2 of the terminal part 141 may range from 7 mm to 8 mm, according to embodiments. Since the diameter D2 of the terminal part 141 may be increased by the increased length of the second flat portion 141b, an external tab can be easily welded to the terminal part 141.

Since the diameter D2 of the terminal part 141 may be increased without increasing the entire diameter D4 of the upper cap 140, the diameter D2 of the terminal part 141 can range from about 40% to about 50% of the entire diameter D4 of the upper cap 140. If the diameter D2 of the terminal part 141 is less than about 40% of the entire diameter D4 of the upper cap 140, the area of the terminal part 141 is decreased, so that welding of an external tab may be difficult. If the diameter D2 of the terminal part 141 is greater than about 50% of the entire diameter D4 of the upper cap 140, the area of the terminal part 141 is sagged, so that welding of an external tab may be difficult.

The safety vent 150 may be formed from a circular plate corresponding to the upper cap 140, and may include a protrusion part 151 protruding downward at its center. Since the protrusion part 151 can pass through a through hole 171 of the lower cap 170, the safety vent 150 may be electrically connected to the sub plate 180 fixed to the lower surface of the lower cap 170. The protrusion part 151 of the safety vent 150 may be welded to the sub plate 180 through laser welding, resistance welding, or an equivalent thereof.

The safety vent 150 may be in close contact with the rest of the upper cap 140 except for the terminal part 141 protruding from the upper cap 140, and can cut off current and exhaust inner gas when abnormal pressure occurs in the can 120. For example, when the inner pressure of the can 120 becomes equal to or greater than an operation pressure of the safety vent 150, the protrusion part 151 can be moved upward by gas exhausted through a gas exhausting hole 172 of the lower cap 170, so that the safety vent 150 becomes electrically separated from the sub plate 180. At this point, a welded portion of the protrusion part 151 may be torn from the sub plate 180, so that the safety vent 150 becomes electrically separated from the sub plate 180. The safety vent 150 becomes ruptured when the inner pressure of the can 120 reaches a rupture pressure of the safety vent 150 over the operation pressure.

The insulator 160 may be formed of electrically insulating material, and disposed between the safety vent 150 and the lower cap 170 to electrically insulate the safety vent 150 and the lower cap 170. The insulator 160 may be disposed between a peripheral part of the safety vent 150 and a peripheral part of the lower cap 170. Accordingly, the center region of the safety vent 150 may be spaced apart from the center region of the lower cap 170. Thus, the safety vent 150 can be electrically separated from the lower cap 170.

The lower cap 170 may be formed from a circular plate. The center of the lower cap 170 may be provided with the through hole 171 through which the protrusion part 151 of the safety vent 150 passes. A side of the lower cap 170 may be provided with the gas exhausting hole 172 through which gas raising the protrusion part 151 of the safety vent 150 is exhausted when excessive inner pressure is generated in the can 120.

The sub plate 180 may be welded to the protrusion part 151 of the safety vent 150 passing through the through hole 171 of the lower cap 170, and a welded portion may be formed between the sub plate 180 and the protrusion part 151 of the safety vent 150. The sub plate 180 may be welded to the positive electrode tab 114 of the electrode assembly 110, and a welded portion may be formed between the sub plate 180 and the positive electrode tab 114 of the safety vent 150. Accordingly, the sub plate 180 can electrically connect the positive electrode tab 114 to the safety vent 150. When the inner pressure of the can 120 is increased, the protrusion part 151 of the safety vent 150 can move upward, and the welded portion can be removed from the sub plate 180, so that the sub plate 180 becomes electrically separated from the safety vent 150. The sub plate 180 may be welded to the protrusion part 151 of the safety vent 150 through laser welding, resistance welding, or an equivalent thereof.

The gasket 190 may be installed at the top opening of the can 120. That is, the gasket 190 may be tightly interposed between the top opening of the can 120 and the periphery of the upper cap 140 and the safety vent 150. The gasket 190 can prevent the removal of the cap assembly 130 from the can 120. The gasket 190 may be formed of resin such as polyethylene terephthalate (PET) or polyethylene (PE) to insulate the can 120 and the cap assembly 130.

Although not shown, a positive temperature coefficient (PTC) device that is a secondary protective device may be installed between the upper cap 140 and the safety vent 150. When the temperature of the secondary battery 100 is over a critical value, the secondary protective device can cut off the current between the upper cap 140 and the safety vent 150 to prevent overheating and explosion of the secondary battery 100.

The secondary battery 100 configured as described above may be provided in plurality to constitute a battery pack. In this case, the secondary batteries 100 may be connected in parallel, the terminal parts 141 may be welded to a positive tab of the battery pack, and the lower plates of the cans 120 may be welded to a negative tab of the battery pack. Such a battery pack may be used for various applications, for example, as an electric source of a notebook computer.

As described above, the secondary battery 100 according to the illustrated embodiment can improve welding efficiency of the terminal part 141 since the second flat portion 141b is disposed at the periphery of the first flat portion 141a to increase the diameter D1 of the terminal part 141 without increasing the diameter D4 of the upper cap 140. As such, the secondary battery 100 can improve the welding efficiency of the terminal part 141, thereby improving the reliability regarding product quality.

In addition, the secondary battery 100 can facilitate exhausting inner gas since the gas exhausting holes 144 are disposed at the connection part 143, the portion of the terminal part 141, and the portion of the peripheral part 142.

According to the illustrated embodiment, since the diameter of the flat portion is increased without increasing the diameter of the upper cap, the secondary battery can improve welding efficiency of the terminal part, thereby improving the reliability regarding product quality.

Certain embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery comprising:
    an electrode assembly;
    a can accommodating the electrode assembly; and
    a cap assembly coupled to an upper portion of the can and including an upper cap that transfers a current of the electrode assembly to an exterior of the can;
    wherein the upper cap includes
        a terminal part including a first flat portion disposed at a center of the upper cap and a second flat portion extending from a periphery of the first flat portion,
        a peripheral part disposed at a periphery of the terminal part and stepped from the terminal part, and
        a connection part connecting the terminal part to the peripheral part having a gas exhausting hole wherein the gas exhausting hole comprises a first curved portion disposed at a portion where the gas exhausting hole meets the terminal part and a second curved portion disposed at a portion where the gas exhausting hole meets the connection part and the peripheral part wherein the gas exhausting hole extends through a portion of the terminal part and a portion of the peripheral part.

2. The secondary battery as claimed in claim 1, wherein the second flat portion is disposed between the first flat portion and the connection part.

3. The secondary battery as claimed in claim 1, wherein the terminal part has a diameter ranging from about 7 mm to about 8 mm.

4. The secondary battery as claimed in claim 1, wherein the terminal part has a diameter ranging from 40% to about 50% of a diameter of the upper cap.

5. The secondary battery as claimed in claim 1, further comprising a plurality of gas exhausting holes, wherein the number of the gas exhausting holes is at least three.

6. The secondary battery as claimed in claim 1, wherein the second flat portion has a planar surface that is obtained by pressing a curved surface between the first flat portion and the gas exhausting hole.

7. The secondary battery as claimed in claim 1, wherein the second flat portion is disposed at a region between the gas exhausting hole and another gas exhausting hole.

8. The secondary battery as claimed in claim 1, wherein the gas exhausting hole comprises a first curved portion disposed at a portion where the gas exhausting hole meets the terminal part, and a second curved portion disposed at a portion where the gas exhausting hole meets the connection part and the peripheral part,
    wherein the first curved portion has a radius of curvature ranging from about 1.4 mm to about 1.6 mm, and
    wherein the second curved portion has a radius of curvature ranging from about 0.1 mm to about 0.3 mm.

9. The secondary battery as claimed in claim 1, wherein the cap assembly comprises:
    a lower cap installed at an upper portion of the electrode assembly and having a through hole at a center of the lower cap;
    a safety vent electrically connected to the electrode assembly; and
    an insulator disposed between the safety vent and the lower cap.

10. The secondary battery as claimed in claim 1, wherein the upper cap is formed of steel plated with nickel.

11. A secondary battery comprising:
    an electrode assembly;
    a can accommodating the electrode assembly; and
    a cap that abuts one side of the can comprising a terminal portion at a center of the cap, a peripheral portion substantially parallel to the terminal portion, a connection portion coupling the terminal portion to the peripheral portion, and at least one opening in the connection portion that extends through a part of the terminal portion wherein the at least one opening comprises a gas exhausting hole wherein the gas exhausting hole comprises a first curved portion disposed at a portion where the gas exhausting hole meets the terminal part and a second curved portion disposed at a portion where the gas exhausting hole meets the connection part and the peripheral part, further comprising a plurality of openings in the connection portion, wherein each opening extends through a part of the terminal portion.

12. The secondary battery of claim 11, wherein the terminal portion comprises a first flat portion disposed at a center of the cap, and a second flat portion extending from a periphery of the first flat portion, wherein the second flat portion is obtained by pressing a curved surface between the first flat portion and the at least one opening.

* * * * *